United States Patent [19]
Raab

[11] Patent Number: 5,926,782
[45] Date of Patent: *Jul. 20, 1999

[54] CONVERTIBLE THREE DIMENSIONAL COORDINATE MEASURING MACHINE

[75] Inventor: Simon Raab, Longwood, Fla.

[73] Assignee: Faro Technologies Inc, Lake Mary, Fla.

[ * ] Notice: This patent is subject to a terminal disclaimer.

[21] Appl. No.: 08/747,600

[22] Filed: Nov. 12, 1996

[51] Int. Cl.[6] .................................................. G01B 7/008
[52] U.S. Cl. ........................ 702/152; 702/153; 702/168; 33/503; 33/504
[58] Field of Search .................................... 364/561, 562, 364/551.02, 275.3, 474.37, 927.1, 468.01, 468.24, 474.01, 474.02, 474.24, 474.36; 33/503, 504, 1 M; 128/774; 356/2; 74/490.01; 702/150, 151, 152, 153, 155, 158, 166, 167, 168

[56] References Cited

U.S. PATENT DOCUMENTS

| | | | |
|---|---|---|---|
| 4,761,072 | 8/1988 | Pryor | 356/1 |
| 5,189,797 | 3/1993 | Granger | 33/1 MP |
| 5,251,127 | 10/1993 | Raab | 364/413.13 |
| 5,305,203 | 4/1994 | Raab | 364/413.13 |
| 5,337,149 | 8/1994 | Kozah et al. | 356/376 |
| 5,380,978 | 1/1995 | Pryor | 219/121.64 |
| 5,402,582 | 4/1995 | Raab | 33/503 |
| 5,408,754 | 4/1995 | Raab | 33/503 |
| 5,412,880 | 5/1995 | Raab | 33/503 |
| 5,418,730 | 5/1995 | Mariani et al. | 364/474.22 |
| 5,510,977 | 4/1996 | Raab | 364/167.01 |
| 5,517,190 | 5/1996 | Gunn | 340/870.18 |
| 5,526,576 | 6/1996 | Fuchs et al. | 33/503 |
| 5,528,505 | 6/1996 | Granger et al. | 364/474.37 |
| 5,611,147 | 3/1997 | Raab | 33/503 |
| 5,616,917 | 4/1997 | Dai | 250/237 G |
| 5,650,852 | 7/1997 | Chastain et al. | 356/383 |
| 5,669,150 | 9/1997 | Guertin et al. | 33/503 |
| 5,682,886 | 11/1997 | Delp et al. | 128/653 |
| 5,768,792 | 6/1998 | Raab | 33/503 |
| 5,794,356 | 8/1998 | Raab | 33/503 |

OTHER PUBLICATIONS

Romer News Release, "New Romer 1000 Series Portable CMMs", Apr. 1, 1996.

*Primary Examiner*—John Barlow
*Assistant Examiner*—Patrick Assouad
*Attorney, Agent, or Firm*—Fishman, Dionne, Cantor & Colburn

[57] ABSTRACT

A coordinate measuring system including a multijointed arm. The multijointed arm includes a plurality of transfer housings for producing signals corresponding to the position of the tip of the arm. A serial box mounted to the arm receive signals from the transfer housings and processes the signals for use by a computer. The serial box emits an audible tone when any one of the transfer housings is rotated beyond a predetermined limit. An earphone jack is provided at the serial box for providing the audible tone to earphones. A speaker may also be mounted in one or more of the transfer housings. One or more of the transfer housings may be placed in a locked state preventing rotation of the transfer housing and eliminating a degree of freedom of the arm.

21 Claims, 9 Drawing Sheets

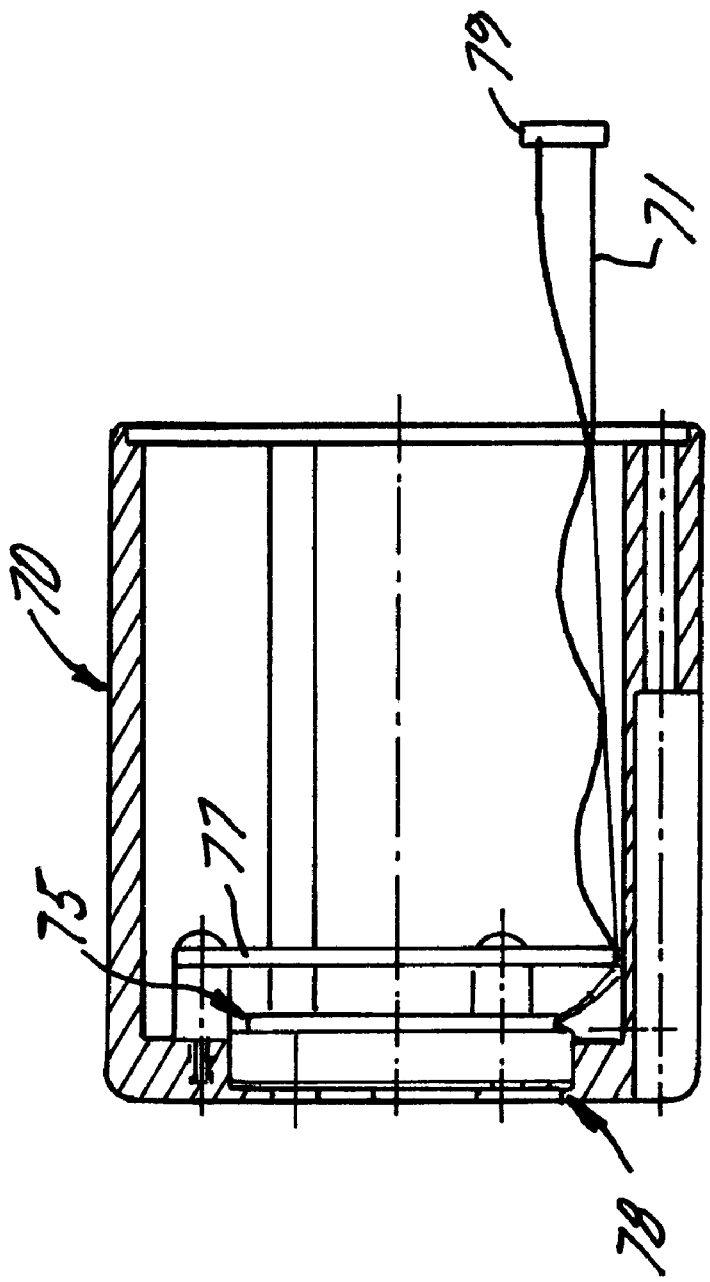

CONVERTIBLE THREE DIMENSIONAL COORDINATE MEASURING MACHINE

BACKGROUND OF THE INVENTION

1. Field of the Invention

This invention relates generally to three dimensional coordinate measuring machines (or CMM's). More particularly, this invention relates to a new and improved three dimensional CMM which is convertible between two or more arm configurations.

2. Prior Art

It will be appreciated that everything in the physical world occupies volume or space. Position in a space may be defined by length, width and height which, in engineering terms, is often called an X, Y, Z coordinate. The X, Y, Z numbers represent the dimensions of length, width and height or three dimensions. Three-dimensional objects are described in terms of position and orientation; that is, not just where an object is but in what direction it points. The orientation of an object in space can be defined by the position of three points on the object. Orientation can also be described by the angles of alignment of the object in space. The X, Y, and Z coordinates can be most simply measured by three linear scales. In other words, if you lay a scale along the length, width and height of a space, you can measure the position of a point in the space.

Presently, coordinate measurement machines or CMM's measure objects in a space using three linear scales. FARO Technologies, Inc. of Lake Mary, Fla. (the assignee of the present invention) has successfully produced a series of electrogoniometer-type digitizing devices for the medical field. In particular, FARO Technologies, Inc. has produced systems for skeletal analysis known as METRECOM® and systems for use in surgical applications known as SUR-GICOM™. Electrogoniometer-type devices of the type embodied in the METRECOM and SURGICOM systems are disclosed in U.S. Pat. Nos. 4,760,851, 5,251,127 and 5,305,203, all of which are assigned to the assignee hereof and incorporated herein by reference.

Portable CMM's are now used for three dimensional measurement of objects for reverse engineering, inspection, etc. An exemplary portable CMM system is disclosed in U.S. Pat. No. 5,402,582 assigned to the assignee of the present application, and which is incorporated herein by reference. As shown in FIG. 1, the three dimensional measuring system of U.S. Pat. No. 5,402,582 generally comprises a coordinate measuring machine (CMM) 10 composed of a manually operated multijointed arm 12 and a support base or post 14, a controller or serial box 16 and a host computer 18. It will be appreciated that CMM 10 electronically communicates with serial box 16 which, in turn, electronically communicates with host computer 18.

As will be discussed in more detail hereinafter, CMM 10 includes transducers (e.g., one transducer for each degree of freedom) which gather rotational positioning data and forward this basic data to serial box 16. Serial box 16 provides a reduction in the overall requirements of host computer 18 to handle certain complex calculations and provides certain preliminary data manipulations. The serial box 16 includes EEPROMS which contain data handling software, a microcomputer processor, a signal processing board and a number of indicator lights 20. As mentioned, basic transducer data is sent from CMM 10 to serial box 16. Serial box 16 then processes the raw transducer data on an ongoing basis and responds to the queries of the host computer with the desired three-dimensional positional or orientational information.

As shown in FIG. 2, the CMM 10 comprises a base 14 connected to a first set of two transfer housings including a first transfer housing 40 which, in turn, is connected to a second transfer housing 42 (positioned transverse to housing 40). A first extension member 44 is rigidly attached to a second set of two transfer housings including a third transfer housing 46 transversely attached to a fourth transfer housing 48. First extension member 44 is positioned perpendicularly between transfer housings 42 and 46. A second extension member 50 is aligned with and rigidly attached to transfer housing 48. Rigid extension member 50 is rigidly attached to a third set of two transfer housings including a fifth transfer housing 52 transversely attached to a sixth transfer housing 54. Fifth transfer housing 54 has attached thereto a handle/probe assembly 56 at the end of the multijointed arm. Additional details of the CMM 10 are disclosed in U.S. Pat. No. 5,402,582 which is incorporated herein by reference.

The CMM systems of the prior art are well suited for their intended purposes. There are, however, drawbacks to these prior designs. One disadvantage is the inability to alter the number of degrees of freedom of the multijointed arm. In addition, it is often difficult to see the display on the serial box and hear audible tones produced by the serial box. Accordingly, there is a continuing need for improved, accurate and low cost CMM's for industrial and related applications.

SUMMARY OF THE INVENTION

The above-discussed and other drawbacks and deficiencies of the prior art are overcome or alleviated by the convertible coordinate measuring system of the present invention. The coordinate measuring system includes a multijointed arm having a plurality of transfer housings for producing signals corresponding to the position of the end of the arm. A serial box mounted to the arm receives signals from the transfer housings and processes the signals for use by a computer. The serial box emits an audible tone when any one of the transfer housings is rotated beyond a predetermined limit. An earphone jack is provided at the serial box for providing the audible tone to earphones. A speaker may also be mounted in one or more of the transfer housings. One or more of the transfer housings may be placed in a locked state preventing rotation of the locked transfer housing and eliminating a degree of freedom of the arm.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES:

FIG. 8 is a cross sectional view of the cap of FIGS. 5–7 including a speaker;

DETAILED DESCRIPTION OF THE INVENTION

Figure 3:
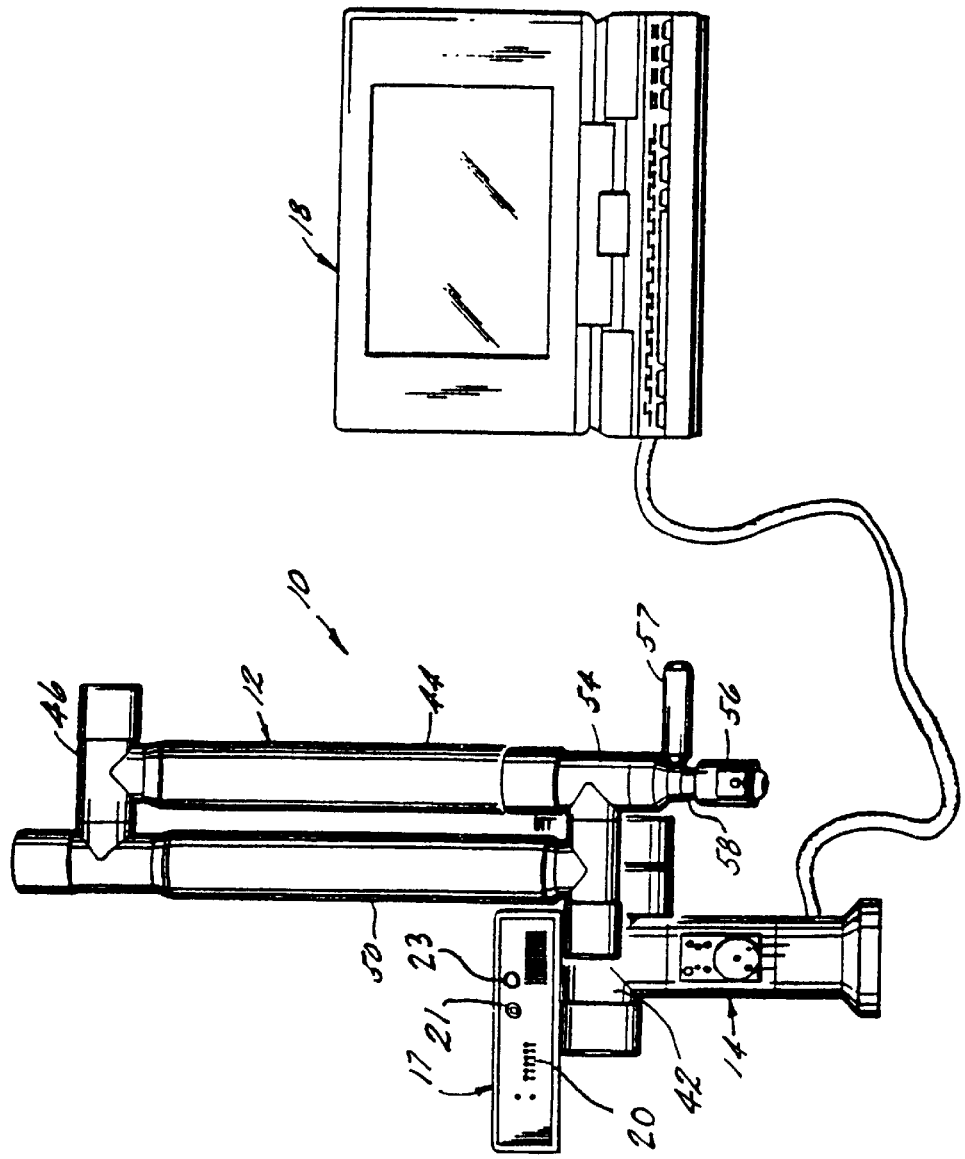
FIG. 3 is a front diagrammatical view depicting a three dimensional measuring system including a coordinate measuring machine, a serial box and a host computer in a first embodiment of the invention.
Figure 4:
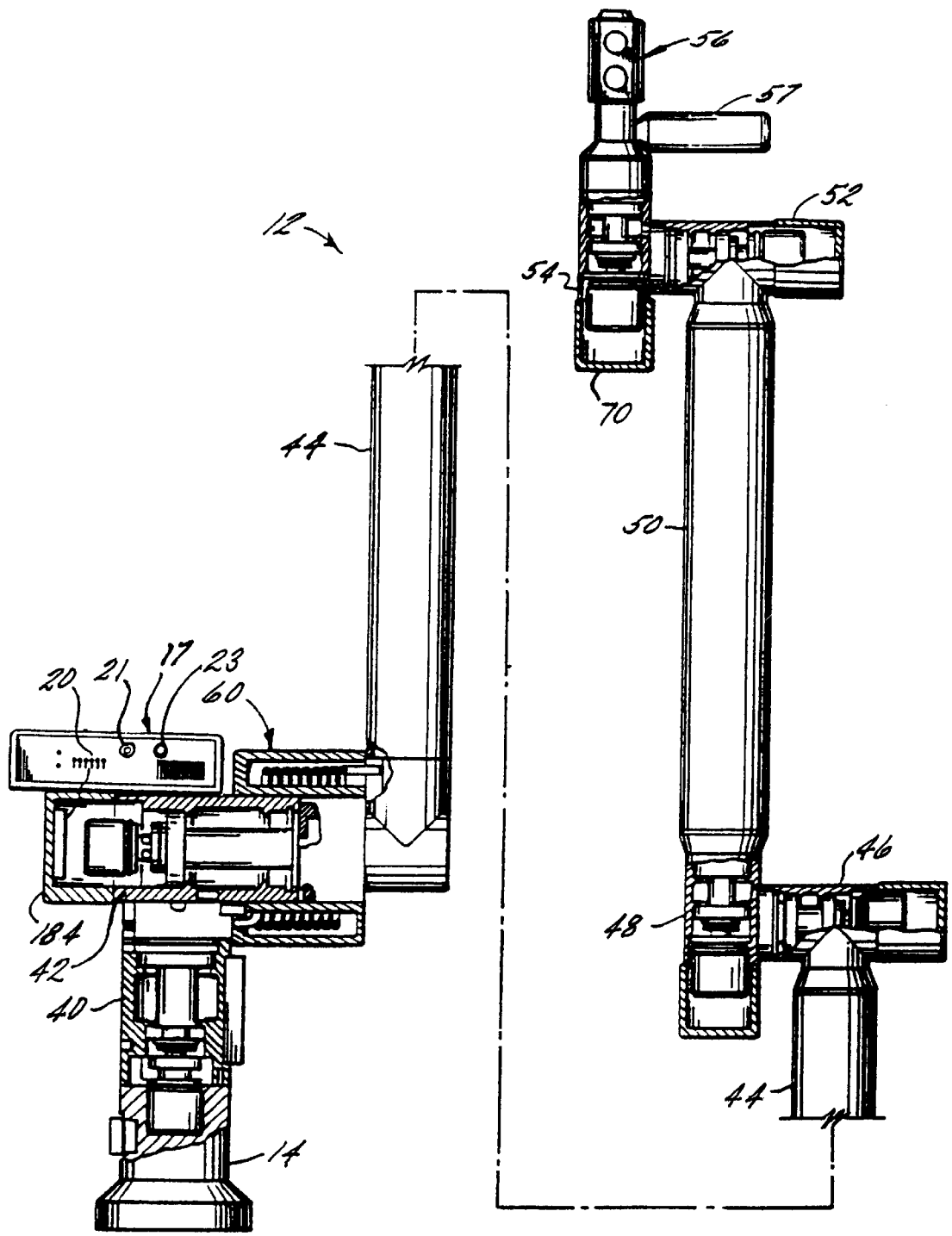
FIG. 4 is a longitudinal view, partly in cross-section of the CMM system of FIG. 3.

FIG. 3 is a front diagrammatical view depicting a three dimensional measuring system including a multijointed arm 12, a serial box 17 and a host computer 18 in a first embodiment of the invention. As shown in FIGS. 3 and 4, a serial box 17 is mounted on the second transfer housing 42. The serial box 17 differs from the conventional serial box 16 in that serial box 17 includes digital signal processing electronics which allows a reduction in size. This reduction in size allows serial box 17 to be mounted directly to the multijointed arm 12, preferably on the second transfer housing 42. This allows the operator to see the serial box display formed by LED's 20 on the face of the serial box 17 as the arm is rotated. In the convention system shown in FIG. 1, the operator can not always see the LEDs on serial box 16 as the operator moves the multijointed arm 12. In the system shown in FIGS. 3 and 4, the serial box 17 rotates along with the multijointed arm thereby allowing the operator to see the LED display 20 at all times.

Figure 1:
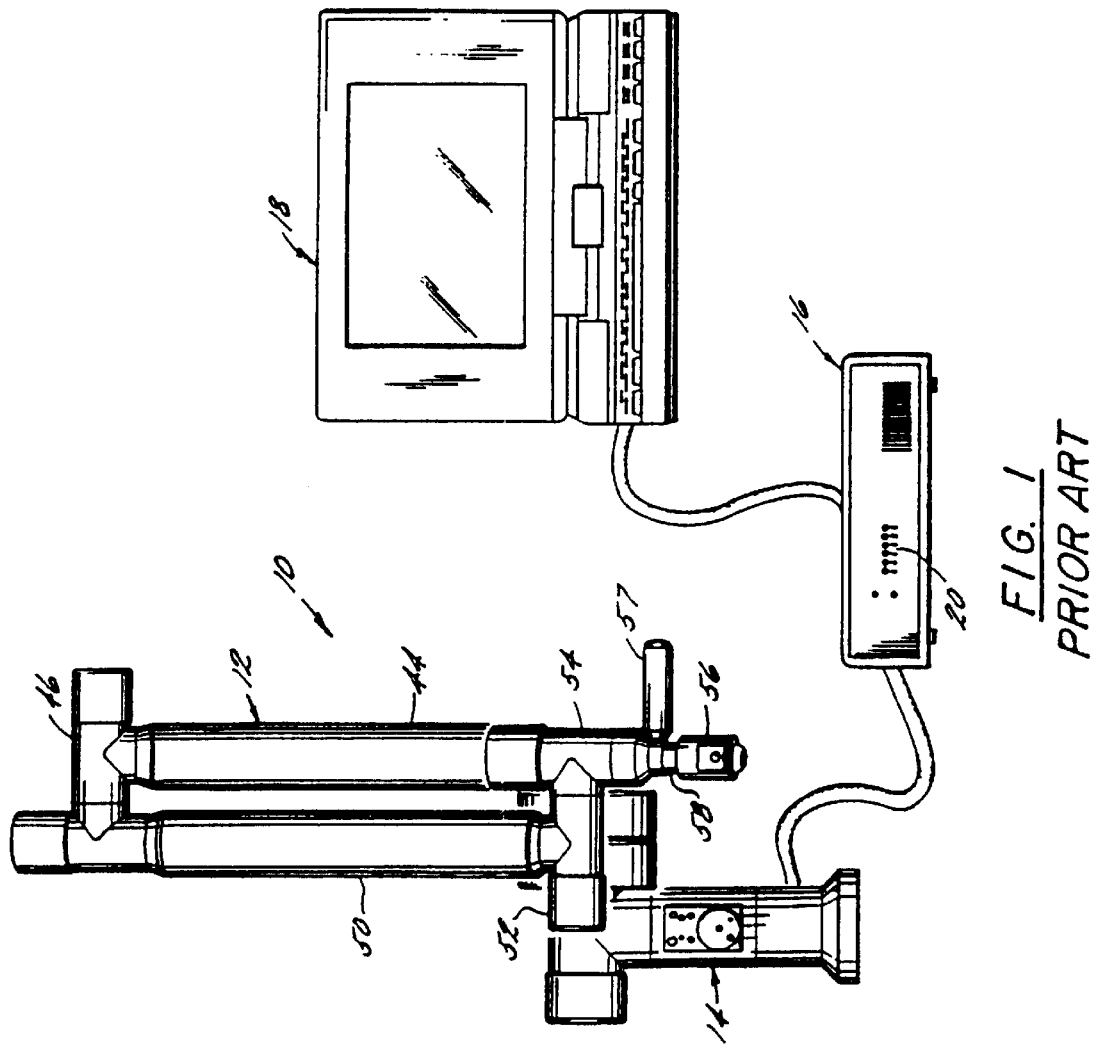
FIG. 1 is a front diagrammatic view depicting a conventional three dimensional measuring system including a coordinate measuring machine, a controller box and a host computer.
Figure 2:
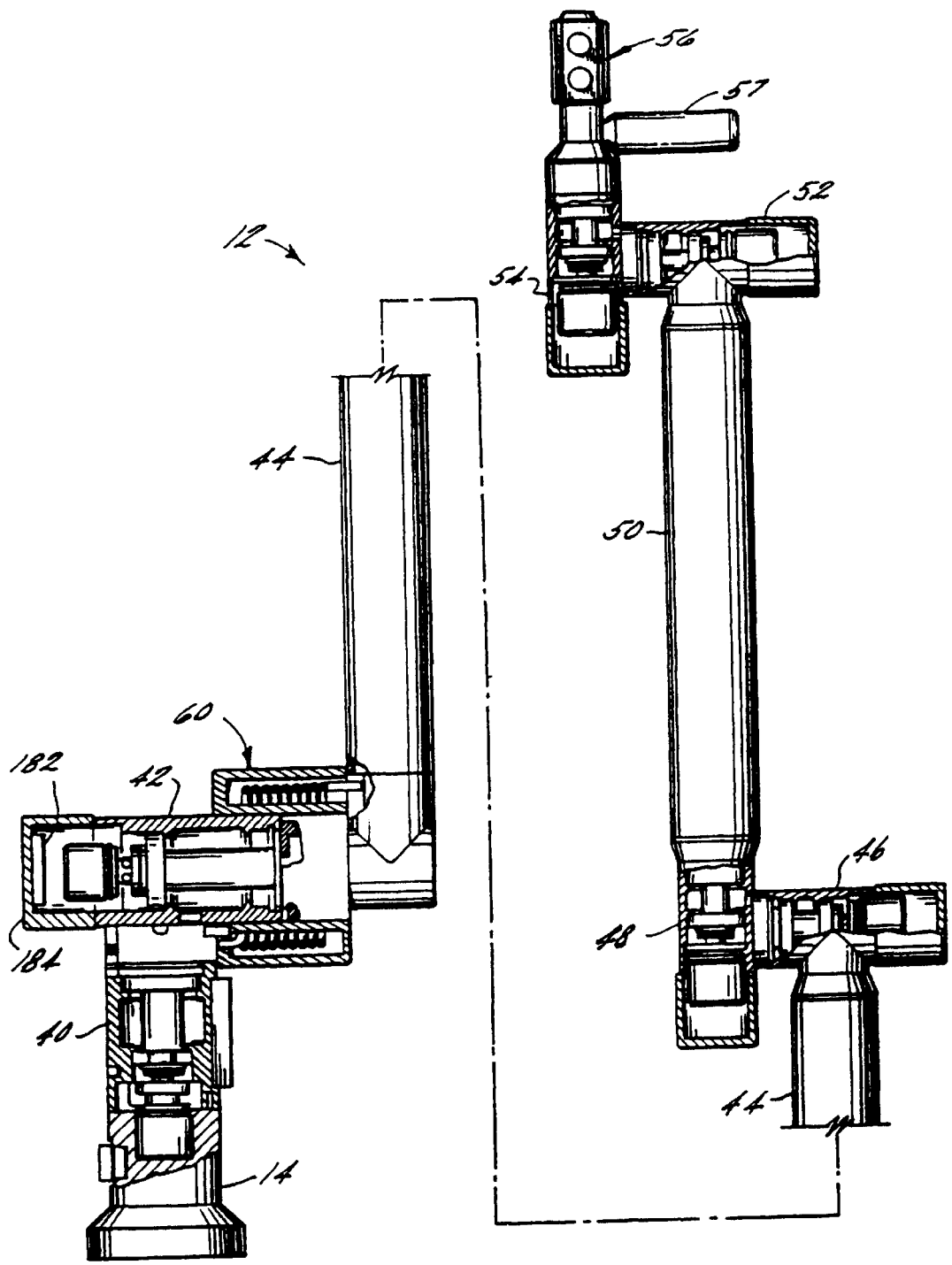
FIG. 2 is a longitudinal view, partly in cross-section of the CMM system of FIG. 1.

In the conventional system shown in FIG. 1, the serial box 16 produces a light and an audible tone should any of the transducers approach its rotational endstop from within 2 degrees, to indicate to the user that the user is too close to the end stop and that the orientation of the arm should be readjusted for the current measurement. It has been found that in industrial environments it is difficult to hear the tones emanating from the serial box 16. To remedy this problem, serial box 17 includes an earphone jack 21 and a volume adjustment control 23. An audible tone signal is provided to the earphone jack. The user may wear an earphone in noisy environments so that the tones produced by the serial box 17 are audible. The volume adjustment control allows the user to control the magnitude of the audible tone signal at the earphone jack 21 and thus, control the volume of the tone produced by the earphone.

Figure 7:
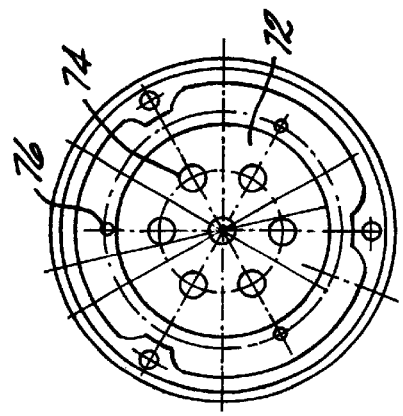
FIGS. 5–7 are various views of a speaker mounting cap for containing a speaker in an exemplary embodiment of the invention.
Figure 6:
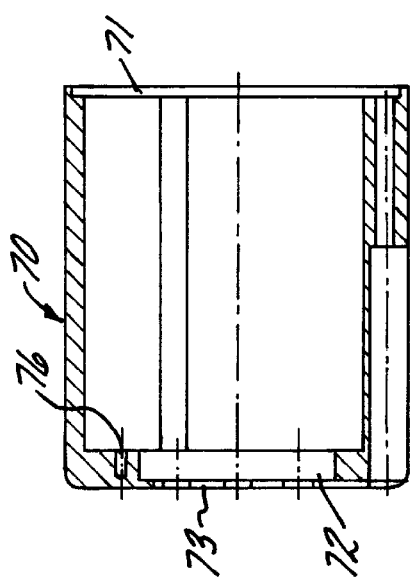
Figure 5:
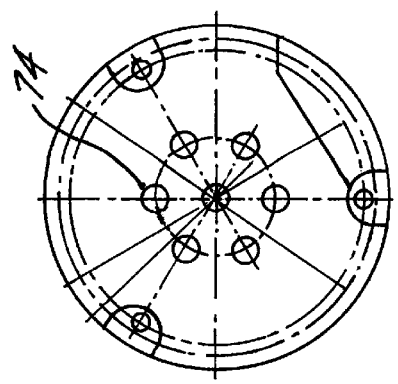

In addition to the earphone jack 21 and volume adjustment control 23, the multijointed arm 12 may include a speaker in the cap of one or more of the transfer housings. FIG. 6 is a side cross-sectional view of a speaker mounting cap 70. The speaker mounting cap includes an open end 71 and a closed end 73. A circular recess 72 is formed in the interior of the cap 70 at the closed end 73. The recess receives a speaker 75 as shown in FIG. 8. A plurality of tapped holes 76 are formed in the interior of the closed end 73. The tapped holes 76 are aligned with holes formed in a mounting flange 77 attached to the speaker 75 (shown in FIG. 8). Screws are placed through the openings in the mounting flange 77 and into tapped holes 76 to mount the speaker 75 in the cap 70. Prior to mounting the speaker 75 in the speaker mounting cap 70, a piece of cloth (e.g. felt) 78 is placed in recess 72. A pair of speaker wires 71 are terminated at a connector 79 and provide a signal for driving speaker 75. As shown in FIG. 5, the closed end 73 of cap 70 includes a plurality of openings 74 to allow sound from the speaker to be emitted from the cap 70. FIG. 7 is a end view of the cap 70 taken from the open end 71.

The speaker mounting cap 70 may be used with any of the transfer housings. As shown in FIG. 4, the speaker receiving cap 70, along with speaker 75, is used with the sixth transfer housing 54. The sixth transfer housing 54 will be closest to the user as the multijointed arm 12 is manipulated and thus it is most likely that the user will hear tones emitted by speaker 75 mounted in cap 70 attached to sixth transfer housing 54. Of course, more than one speaker mounting cap may be used in the multijointed arm to enhance the user's ability to hear the audible tone.

Figure 9A:
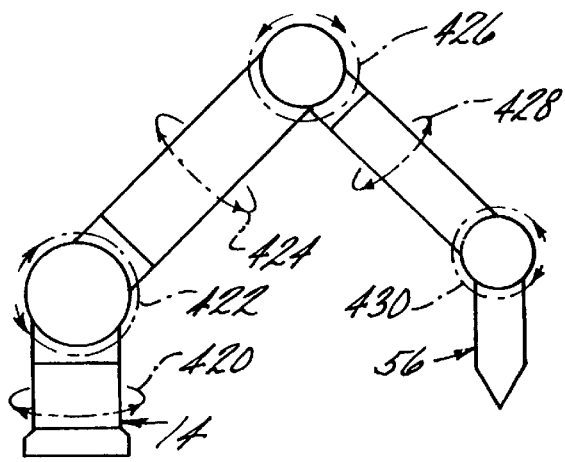
FIG. 9A is a diagrammatic front elevation view of a measuring arm having six degrees of freedom in a 2-2-2 configuration.
Figure 9B:
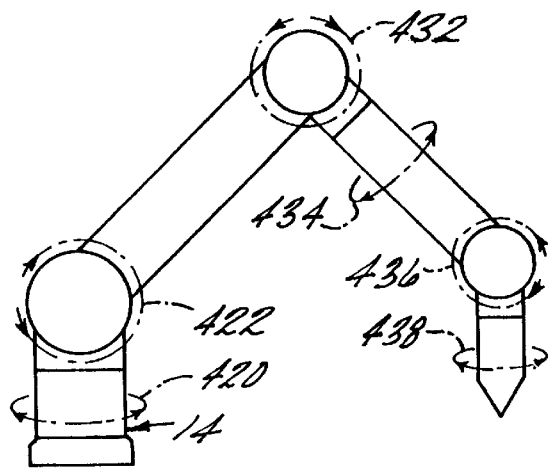
FIG. 9B is a diagrammatic front elevation view of a measuring arm having six degrees of freedom in a 2-1-3 configuration.
Figure 9C:
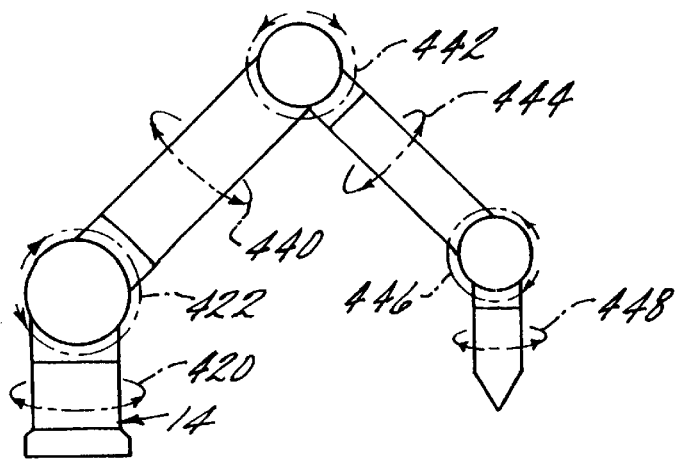
FIG. 9C is a diagrammatic front elevation view of a measuring arm having seven degrees of freedom in a 2-2-3 configuration.

FIGS. 9A–9C illustrates three basic arm configurations disclosed in pending U.S. patent application Ser. No. 08/398,592, now U.S. Pat. No. 5,611,147, which is incorporated herein by reference. Two of these arm configurations allow for six degrees of freedom. A third arm configuration allows for seven degrees of freedom. Each configuration has advantages for different functions and/or measuring conditions as dictated by the objects being measured or the function or operation being performed.

The multijointed arm may be compared to the arm configuration of the human body as consisting of elements such as a shoulder which would be equivalent to support base 14, an elbow element between extension members 44 and 50 (shown in FIGS. 3 and 4) is the equivalent of the elbow of the human arm and the handle/probe assembly 56 is equivalent to the human wrist. In each configuration, the support base 14 allows two degrees of freedom as indicated by the rotational arrows 420 and 422. The design of FIG. 9A, which has two degrees of freedom represented at the shoulder, elbow and wrist (designated 2-2-2), is more easily able to probe into difficult to reach areas. On the other hand, the FIG. 9B design which has two degrees of freedom at the shoulder, one degree of freedom at the elbow and three degrees of freedom at the wrist. The three degrees of rotation (2-1-3 design) at the end effector (wrist) allows full orientation and positioning of an object or non-axial probe. The third arm configuration (FIG. 9C) has the combined advantages of the two arm configurations discussed above by providing seven degrees of freedom (a 2-2-3 configuration).

As previously stated, all three configurations have two degrees of freedom at the shoulder (support base 14). In FIG. 9A, the two degrees of freedom of the elbow are designated by the rotational arrows 424, 426 and finally the two degrees of freedom at wrist (or effect element) assembly 56 are designated by the rotational arrows 428, 430. In FIG. 9B, the one degree of freedom of the elbow segment is designated by the rotational arrow 432 and the three degrees of freedom at the wrist are designated by rotational arrows 434, 436, and 438. Lastly, in FIG. 9C, the two degrees of freedom of the elbow segment are designated by the rotational arrows 440 and 442 and the three degrees of freedom at the wrist are designated by rotational arrows 444, 446 and 448. Additional details of these arm configurations are disclosed in pending U.S. patent application Ser. No. 08/398,592, which is incorporated herein by reference.

Each of the above arm configurations provides certain advantages. For example, a 2-1-3 configuration is typically used for locating objects in three dimensional space and for reverse engineering. In applications that require superior flexibility, a 2-2-2 configuration has typically been used. Given these demands, it is desirable to provide a multijointed arm having the ability to convert from one configuration to another.

Figure 10:
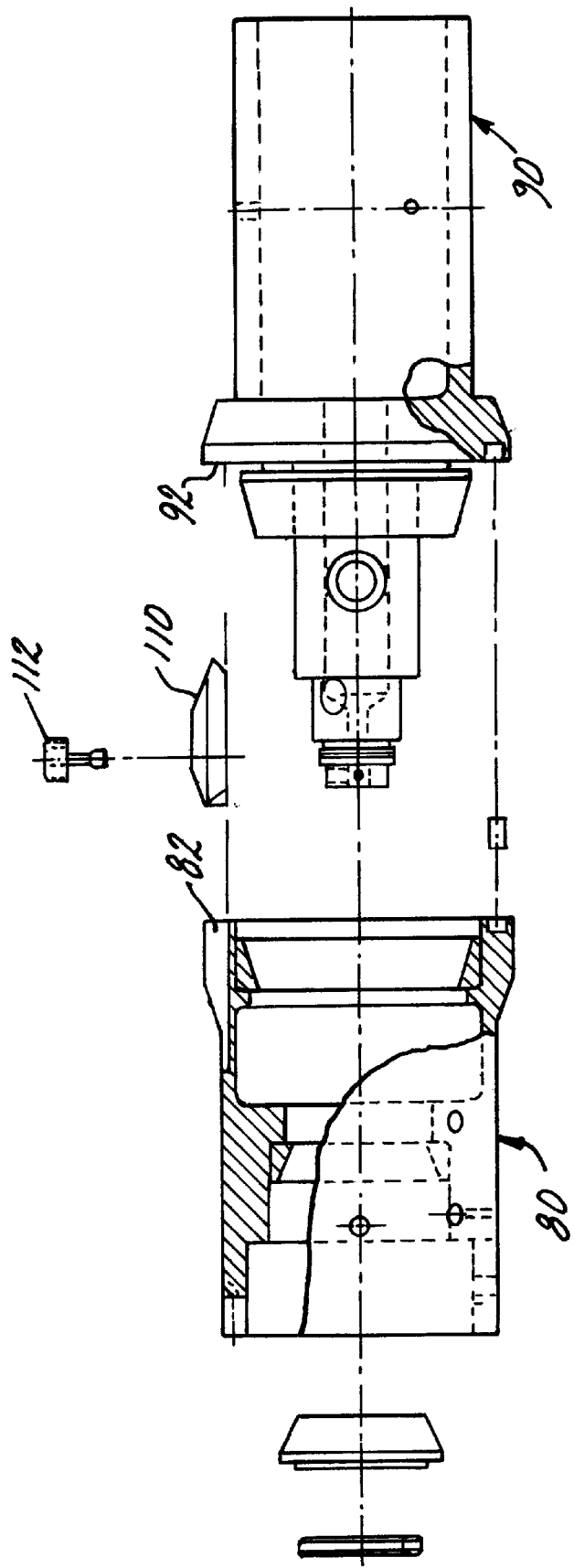
FIG. 10 is an exploded view of a locking transfer case.

FIG. 10 is an exploded view of a locking transfer case in accordance with the present invention. A transfer housing includes a transfer case made up of a transfer case housing 80 and a transfer case shaft 90. The transfer case housing 80 and transfer case shaft 90 rotate relative to each other to provide a degree of freedom. The present invention provides a mechanism for locking the rotation of the transfer case housing 80 relative to the transfer case shaft 90 to provide a locking transfer case. The locking transfer case may be used in one or more of the transfer housings of the multijointed arm to selectively eliminate a degree of freedom. The locking transfer case includes a stop 110 that engages recesses 82 and 92 formed near the periphery of the transfer case housing 80 and transfer case shaft 90, respectively. A post 112 extends away from the stop 110 and provides a surface for the user to apply pressure and move the stop 110.

Figure 13:
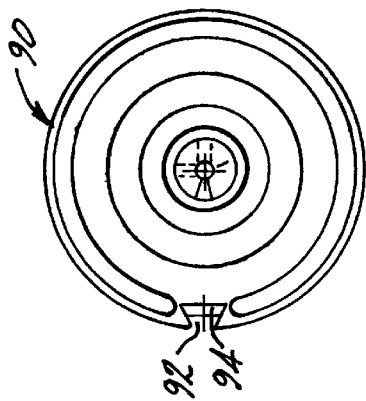
FIG. 13 is an end view of a transfer case shaft.
Figure 14:
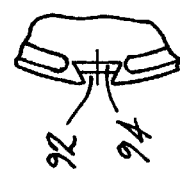
FIG. 14 is an enlarged view of a portion of FIG. 13.
Figure 11:
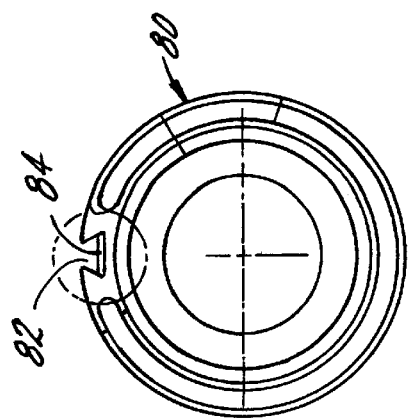
FIG. 11 is an end view of a transfer case housing.
Figure 12:
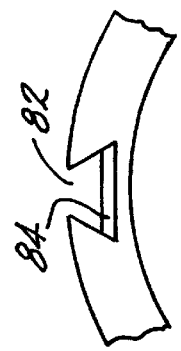
FIG. 12 is an enlarged view of a portion of FIG. 11.

In the unlocked state, the stop 110 is positioned within recess 82 formed in the transfer case housing 80 and the stop 110 does not project into recess 92 formed in the transfer case shaft 90. When the stop 110 is moved towards the transfer case shaft 90, the stop 110 engages both recess 82 and recess 92. This prevents the transfer case housing 80 from rotating relative to the transfer case shaft 90 and eliminates one degree of freedom in the multijointed arm. FIG. 11 is an end view of the transfer case housing 80 and FIG. 12 is an enlarged view of the recess 82. The recess 82 includes a shoulder 84 at an end of the recess to stop the travel of the stop 110. As shown in FIGS. 13 and 14, the transfer case shaft 90 also includes a recess 92 having a shoulder 94 at an end of the recess to stop travel of the stop 110.

Figure 15:
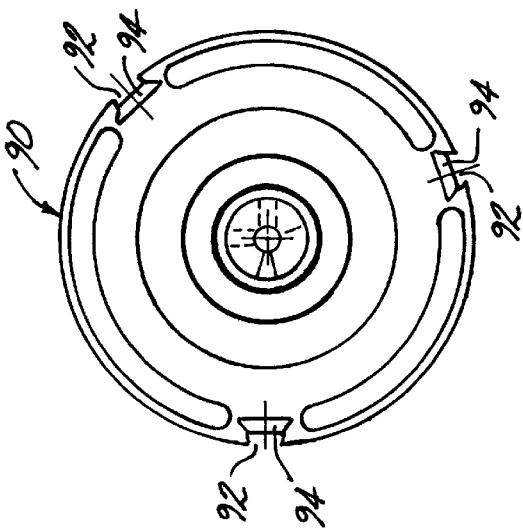
FIG. 15 is an end view of a transfer case shaft in an alternative embodiment.

FIG. 15 is an end view of the transfer case shaft 90 in an alternative embodiment of the invention. In this embodiment, the transfer case shaft 90 includes a plurality of recesses 92 formed along its periphery. This allows the transfer case to be locked in a variety of positions. It is also possible to include one recess 92 on the transfer case shaft 90 and multiple recess 82 on the transfer case housing 80 in order to achieve multiple locking positions.

In the embodiments shown in FIGS. 10–15, the recesses 82 and 92 have a trapezoidal shape and the stop 110 has a corresponding trapezoidal cross-section. This trapezoidal shape prevents the stop 110 from being inadvertently removed from the recesses 82 and 92. It is understood that other locking mechanisms could be used and the invention is not limited to the trapezoidal shape shown in FIGS. 10–15. For example, the stop could be implemented using a cylindrical pin that engages cylindrical recesses formed in the transfer case housing 80 and transfer case shaft 90.

The present invention allows one or more of the transfer housings in the multijointed arm to be locked thereby eliminating a degree of freedom. This allows the multijointed arm of FIG. 9C to be converted from a 2-2-3 configuration to a 2-1-3 configuration. Of course, other joints may have a degree of freedom eliminated by locking the appropriate transfer case. Accordingly, the locking transfer case may be used in any of the transfer housings used in the multijointed arm, regardless of the arm configuration.

While preferred embodiments have been shown and described, various modifications and substitutions may be made thereto without departing from the spirit and scope of the invention. Accordingly, it is to be understood that the present invention has been described by way of illustration and not limitation.

What is claimed:

1. A coordinate measuring system comprising:
    a multijointed arm having an end and a plurality of transfer housings for generating signals indicating the position of said end; and
    a serial box mounted to said multijointed arm for processing signals from said transfer housings;
    said serial box is mounted to one of said plurality of transfer housings.

2. The coordinate measuring system of claim 1 wherein:
    said serial box includes a display.

3. A coordinate measuring system comprising:
    a multijointed arm having an end and a plurality of transfer housings for generating signals indicating the position of said end; and
    a serial box for processing signals from said transfer housings, said serial box producing an audible tone when one of said transfer housings is rotated beyond a predetermined limit;
    said serial box is mounted to one of said plurality of transfer housings.

4. The system of claim 3 wherein said serial box comprises:
    an earphone jack for receiving an audible tone signal corresponding to the audible tone.

5. The system of claim 4 wherein said serial box further comprises:
    a volume adjustment control for controlling the magnitude of the audible tone signal at said earphone jack.

6. The system of claim 3 further comprising:
    a speaker mounted in one of said transfer housings for producing the audible tone.

7. The system of claim 6 wherein:
    said transfer housing including said speaker has openings formed therein proximate to said speaker.

8. A transfer housing for use in a coordinate measuring arm, said transfer housing comprising:
    a transfer case housing;
    a transfer case shaft; and
    a stop for selectively engaging said transfer case housing and said transfer case shaft and preventing rotation of said transfer case housing relative to said transfer case shaft.

9. The transfer housing of claim 8 wherein:
    said transfer case housing includes at least one transfer case housing recess;
    said transfer case shaft includes at least one transfer case shaft recess; and
    when the transfer housing is in a locked state, said stop is positioned in said transfer case housing recess and said transfer case shaft recess and when the transfer housing is in an unlocked state, said stop is positioned in one of said transfer case housing recess and said transfer case shaft recess.

10. The transfer housing of claim 9 further comprising:
    a post extending away from said stop.

11. The transfer housing of claim 9 wherein:
    said transfer case shaft has a plurality of recesses.

12. The transfer housing of claim 9 wherein:
    said transfer case housing has a plurality of recesses.

13. The transfer housing of claim 8 wherein said transfer case housing recess, said transfer case shaft recess and said stop have a trapezoidal shape.

14. A multijointed arm for use in a coordinate measuring system, said multijointed arm comprising:
- at least one locking transfer case for selectively converting the multijointed arm between a first configuration having a first number of degrees of freedom and a second configuration having a second number of degrees of freedom.

15. The coordinate measuring system of claim 2 wherein:
said display comprises at least one light emitting diode.

16. The multi-jointed arm of claim 14 wherein:
said at least one locking transfer case includes:
- a transfer case housing;
- a transfer case shaft; and
- a stop for selectively engaging said transfer case housing and said transfer case shaft and preventing rotation of said transfer case housing relative to said transfer case shaft.

17. The multi-jointed arm of claim 17 wherein:
said transfer case housing includes at least one transfer case housing recess;

said transfer case shaft includes at least one transfer case shaft recess; and when the transfer housing is in a locked state, said stop is positioned in said transfer case housing recess and said transfer case shaft recess and when the transfer housing is in an unlocked state, said stop is positioned in one of said transfer case housing recess and said transfer case shaft recess.

18. The multi-jointed arm of claim 17 further comprising:
a post extending away from said stop.

19. The multi-jointed arm of claim 17 wherein:
said transfer case shaft has a plurality of recesses.

20. The multi-jointed arm of claim 17 wherein:
said transfer case housing has a plurality of recesses.

21. The multi-jointed arm of claim 18 wherein said transfer case housing recess, said transfer case shaft recess and said stop have a trapezoidal shape.

\* \* \* \* \*